(12) United States Patent
Kishiro et al.

(10) Patent No.: US 7,363,174 B2
(45) Date of Patent: Apr. 22, 2008

(54) APPARATUS AND METHOD FOR MEASURING A FLUID FLOW RATE PROFILE USING ACOUSTIC DOPPLER EFFECT

(75) Inventors: Masami Kishiro, Tokyo (JP); Toshihiro Yamamoto, Tokyo (JP); Hironobu Yao, Tokyo (JP); Yoshinori Ohmuro, Tokyo (JP); Noritomo Hirayama, Tokyo (JP)

(73) Assignee: Fuji Electric Systems Co., Ltd. (JP)

( * ) Notice: Subject to any disclaimer, the term of this patent is extended or adjusted under 35 U.S.C. 154(b) by 0 days.

(21) Appl. No.: 11/183,181

(22) Filed: Jul. 15, 2005

(65) Prior Publication Data
US 2006/0020404 A1 Jan. 26, 2006

(30) Foreign Application Priority Data
Jul. 20, 2004 (JP) ............................. 2004-210965

(51) Int. Cl.
G01F 17/00 (2006.01)
G01F 23/00 (2006.01)
G01L 7/00 (2006.01)

(52) U.S. Cl. .................. 702/54; 73/861.25; 73/861.26; 73/861.27; 73/861.28

(58) Field of Classification Search .................. 702/54; 73/861.25–861.28
See application file for complete search history.

(56) References Cited

U.S. PATENT DOCUMENTS 4,259,870 A * 4/1981 McLeod et al. ......... 73/861.25
4,930,358 A * 6/1990 Motegi et al. ........... 73/861.28
6,564,649 B1 * 5/2003 Toda ....................... 73/861.26
2005/0245827 A1 * 11/2005 Takeda et al. ............. 600/450

FOREIGN PATENT DOCUMENTS

JP 2000-97742 A 4/2000
WO 03/102513 A1 12/2003

OTHER PUBLICATIONS

European Search Report of corresponding patent application No. EP 05 01 5770; with a mailing date of Mar. 14, 2007.
Submission of Publication and the like issued in the corresponding Japanese patent application No.: 2004-210965, dated Nov. 20, 2007.

(Continued)

Primary Examiner—John Barlow
Assistant Examiner—Sujoy Kundu
(74) Attorney, Agent, or Firm—Rossi, Kimms & McDowell, LLP

(57) ABSTRACT

An apparatus and method for measuring a flow velocity profile of fluid traveling in a pipe or conduit uses an ultrasonic wave transmitted from an ultrasonic wave transducer mounted at an angle on the outside of a pipe using a wedge, and made incident onto the fluid in the pipe to measure the fluid flow velocity profile, using the principle that a frequency of an ultrasonic wave, reflected by a reflector existing in the fluid, is changed depending on a flow velocity due to Doppler effect. The transmission frequency and the angle of incidence onto the pipe can be selected to suppress frequency dependence of a measured value due to Lamb wave and allow the flow velocity or flow rate of fluid to be measured with a greater accuracy.

26 Claims, 9 Drawing Sheets

OTHER PUBLICATIONS

Ryohei et al.; "Study in Spatial Frequency Domain on Acoustic Wave Propagation Path of Clamp-on Uktrasonic Flowmeter and Efficiency of Plate Mode Excitation on Pipe Wall"; The Acoustic Society of Japan Journal; 1993; vol. 49 No.: 11.

Ryohei et al.; "Wide Beam Ultrasonic Flowmeter"; The Society of Instrument and Control Engineers Collected Articles; 1993; vol. 29 No.: 7; pp. 745-752.

* cited by examiner

| | FREQUENCY AT WHICH ANGLES OF REFRACTION OF LAMB WAVE REACHES 90° | | | | |
|---|---|---|---|---|---|
| | PLATE THICKNESS (mm) | | | | |
| | 2 | 4 | 6 | 8 | 10 |
| A1 | 2.70 | 1.35 | 0.90 | 0.68 | 0.54 |
| S1 | 4.05 | 2.03 | 1.35 | 1.01 | 0.81 |
| A2 | 5.41 | 2.70 | 1.80 | 1.35 | 1.08 |
| S2 | 6.76 | 3.38 | 2.25 | 1.69 | 1.35 |

APPARATUS AND METHOD FOR MEASURING A FLUID FLOW RATE PROFILE USING ACOUSTIC DOPPLER EFFECT

BACKGROUND

As is well-known, the clamp-on Doppler ultrasonic flow velocity profile meter measures a flow velocity profile or a flow rate of fluid by measuring the velocities of suspended particles or bubbles contained in the fluid, on the assumption that the suspended particles or bubbles move at the same velocity as that of the fluid. Referring to FIG. 14, which illustrates the operation principle of a Doppler ultrasonic flow velocity profile meter, an ultrasonic wave transducer 11 is secured and positioned to an outer surface of a pipe 21 at an angle relative to the pipe 21 with a sound wave propagative wedge 31. From the ultrasonic wave transducer 11, an ultrasonic wave pulse with a fundamental frequency of $f_O$ is transmitted to the pipe 21 at an angle of incidence $\theta_w$. The incident ultrasonic wave pulse is reflected by reflectors 23, such as suspended particles, in a fluid 22 with a frequency of an echo shifted from the fundamental frequency, depending on the moving velocity of the reflectors 23 (flow velocity of the fluid), namely based on the Doppler effect. A Doppler shift frequency $f_d$ of the echo in this case is expressed by the following expression (1):

$$f_d = (2 \cdot V_f \sin\theta_f f_O)/C_f \quad (1),$$

where $V_f$ is the flow velocity of the fluid 22, $\theta_f$ is an angle of refraction of the ultrasonic wave at the boundary plane between the pipe 21 and the fluid 22, and $C_f$ is the sound velocity in the fluid 22.

Therefore, the flow velocity V of the fluid 22 can be obtained by the following expression (2). The flow velocity $V_f$ and the Doppler shift frequency $f_d$, each being a function of a position x along the radial direction, are expressed as $V_f(x)$ and $f_d(x)$, respectively:

$$V_f(x) = (C_f \cdot f_d(x))/(2 \cdot \sin\theta_f f_O). \quad (2)$$

Referring to FIG. 15, which illustrates the principal part of the flow velocity profile meter shown in FIG. 14 and a flow velocity profile at position x in the pipe 21. From the expression (2), current velocities $V_f$ on a measuring line ML of the ultrasonic wave pulse are measured at specified intervals to obtain a flow velocity profile. The obtained profile is integrated about the cross sectional area A of the pipe 21 and is expressed in the following expression (3) to obtain the flow rate of the fluid 22:

$$Q = \int V_f dA \quad (3).$$

FIG. 16 illustrates the entire arrangement of the clamp-on Doppler ultrasonic flow velocity profile meter (a block diagram showing the ultrasonic wave transducer 11 and an inner arrangement of a converter 18 connected to the transducer 11). The arrangement is substantially the same as that of, for example, the Doppler ultrasonic flow meter shown in FIG. 1 of JP-A-2000-97742. Referring to FIG. 16, a transmission and reception timing control unit 12 controls the transmission timing of an ultrasonic wave pulse and reception of the echo. The transmission and reception timing control unit 12 controls a transmitted pulse generating unit 13 to produce a pulse signal for generating an ultrasonic wave pulse transmitted from the ultrasonic wave transducer 11. The ultrasonic wave transducer 11 also receives an echo. A signal due to the received echo is amplified by a received signal amplifying and controlling unit 14. The amplified received signal is subjected to analog to digital conversion at an A/D converting unit 15 according to an A/D sampling clock from the transmission and reception timing control unit 12. The digitized signal is subjected to an operation according to the above expression (2) at a flow velocity profile operation unit 16, to obtain the flow velocity profile. The obtained flow velocity profile is further subjected to the operation according to the above expression (3) at a flow rate operation unit 17, to obtain the flow rate.

According to the above-explained principle, it is possible for the flow velocity $V_f$ and the flow rate Q of the fluid 22 to be actually calculated with the expressions (2) and (3) without depending on the transmission frequency $f_O$ of the ultrasonic wave pulse. The present inventors, however, found that the difference in transmission frequency $f_O$ of an ultrasonic wave changes the obtained flow velocity $V_f$ and the flow rate Q. In particular, such frequency dependence becomes remarkable when the pipe 21 is made of thin metallic material, while the frequency dependence becomes small when the pipe 21 is made of plastic.

Moreover, in an ultrasonic flow velocity profile meter disclosed in Japanese Patent Application No. 2003-396755, an ultrasonic wave transducer is secured to a wedge to position it at an angle relative to the pipe by taking an angle of incidence of an ultrasonic wave incident on the pipe from the wedge as being no less than the critical angle for a longitudinal wave in the pipe and no more than the critical angle for a shear wave in the pipe. This is provided so that only a shear wave is propagated in the pipe when the sound velocity of the shear wave of an ultrasonic wave propagating in the pipe is equal to or greater than the sound velocity of the longitudinal wave in the wedge (when a metallic pipe is used). According to the flow velocity profile meter, the echo from the reflectors in the fluid to be measured becomes a wave due to only the shear wave propagating in the pipe before being incident on the fluid. Thus, the echo due to the longitudinal wave is not received by the transducer to reduce acoustic noises. However, the problem of frequency dependence of the above-described flow velocity $V_f$ and the flow rate Q is left unsolved.

Accordingly, there still remains a need to solve the above problem and provide an apparatus and method for measuring a flow velocity profile that has a small frequency dependence, while capable of measuring the flow velocity and the flow rate with a higher accuracy. The present invention addresses this need.

SUMMARY OF THE INVENTION

The present invention relates to an apparatus and method for measuring a flow velocity profile of fluid flowing in a tubular member, such as a conduit or tube, using the Doppler principle.

One aspect of the invention is an apparatus for measuring a flow velocity profile of fluid flowing in a tubular member made of material that allows an acoustic wave to propagate therethrough, based on the frequency of ultrasonic wave reflected off reflectors existing in the fluid changing depending on the fluid flow velocity due to Doppler effect. The apparatus can include a wedge and an ultrasonic wave transducer. The wedge externally mounts to the tubular member and is made of material that allows an acoustic wave to propagate therethrough. The ultrasonic wave transducer emits an ultrasonic wave and is mounted to the wedge at an inclination relative to the direction in which the fluid travels through the tubular member.

The frequency of the transmitted ultrasonic wave emitted by the ultrasonic wave transducer can be set at a frequency other than the frequency at which an angle of refraction of a wave in each mode of Lamb wave in the tubular member becomes 90°. The frequency at which the wave angle of refraction in each mode of lamb wave in the tubular member becomes 90° can be calculated from an angle of incidence of the ultrasonic wave made incident onto the tubular member from the wedge, a sound velocity in the wedge, sound velocities of a shear wave and a longitudinal wave in the tubular member, and a wall thickness of the tubular member.

The frequency of the transmitted ultrasonic wave can be around the central frequency between two frequencies at each of which an angle of refraction of a wave in each of two successive modes of Lamb wave in the tubular member becomes 90°. Again, each of the two frequencies can be calculated as mentioned previously.

The frequency of the transmitted ultrasonic wave can be set lower than the frequency at which an angle of refraction of a wave in a first order mode of antisymmetric Lamb wave in the tubular member becomes 90°. Again, the frequency at which the wave angle of refraction in the first order mode of antisymmetric Lamb wave in the tubular member becomes 90° can be calculated as mentioned previously.

The frequency of the transmitted ultrasonic wave can be set at a frequency lower than a cutoff frequency of a wave in a first order mode of antisymmetric Lamb wave, the cutoff frequency being determined from a dispersion curve of the Lamb wave.

The ultrasonic wave can be made incident from the wedge onto the tubular member at an angle of incidence larger than the angle of incidence at which an angle of refraction of a wave in a first order mode of antisymmetric Lamb wave in the tubular member becomes 90°.

An asymptotic solution of a characteristic equation of Lamb wave can be used as a phase velocity of the Lamb wave for determining the frequency of the transmitted ultrasonic wave.

Another aspect of the invention is a method of measuring the flow velocity profile as described above. The method includes mounting externally on the tubular member, the wedge, mounting the ultrasound transducer on the wedge as previously described, and setting the frequency of the transmitted ultrasonic wave emitted by the ultrasonic wave transducer at the frequency or the angle of incidence as described above.

The method can further include deriving an actual flow calibration constant for calibrating the flow rate derived from a measured flow velocity profile by calculating the flow rate from the flow velocity profile measured with the ultrasonic wave transducer mounted on a reference tubular member at a reference flow rate and comparing the calculated flow rate to a reference flow rate as measured by a reference flow rate measuring device. The actual flow calibration constant can be held as a calibration constant characteristic of each ultrasonic wave transducer. The measured flow velocity profile can be corrected on the basis of the result of calculation of measurement error due to Lamb wave.

DETAILED DESCRIPTION

The preferred embodiments of the invention will be explained with reference to drawings. First, according to the studies carried out by the inventors, the above frequency dependence is caused by a dispersion phenomenon (a phenomenon of sound velocity variation depending on the frequency) occurring in a tubular member or body, e.g., a conduit or pipe. The dispersion phenomenon is, when the pipe is deemed to be a plate having the same wall thickness as that of the pipe, considered to be caused by normal modes of waves propagating in the plate with the plate taken as a waveguide. Here, each of the normal modes of waves in the plate is a sound wave having a specified frequency and a specified wavelength satisfying a boundary condition and propagating along an infinitely extending flat plate having a finite thickness. The occurrence of the normal modes of waves in the plate depends on the material and the thickness of the plate.

The normal modes of waves in the plate are presented as an SH wave (a horizontally-polarized shear wave) and a Lamb wave. Here, the Lamb wave is, as is well known, a wave in which the longitudinal wave and the SV wave (vertically-polarized shear wave) are combined with each other while causing mode conversion on the upper face of a flat plate. Of the normal modes of waves in a plate, the SH wave, causing no longitudinal wave at the boundary between the flat plate and fluid, is considered not to propagate in the fluid. Therefore, it is the Lamb wave that causes the dispersion phenomenon, and the behavior of the Lamb wave is considered the cause of the previously described frequency dependence.

Figure 1:
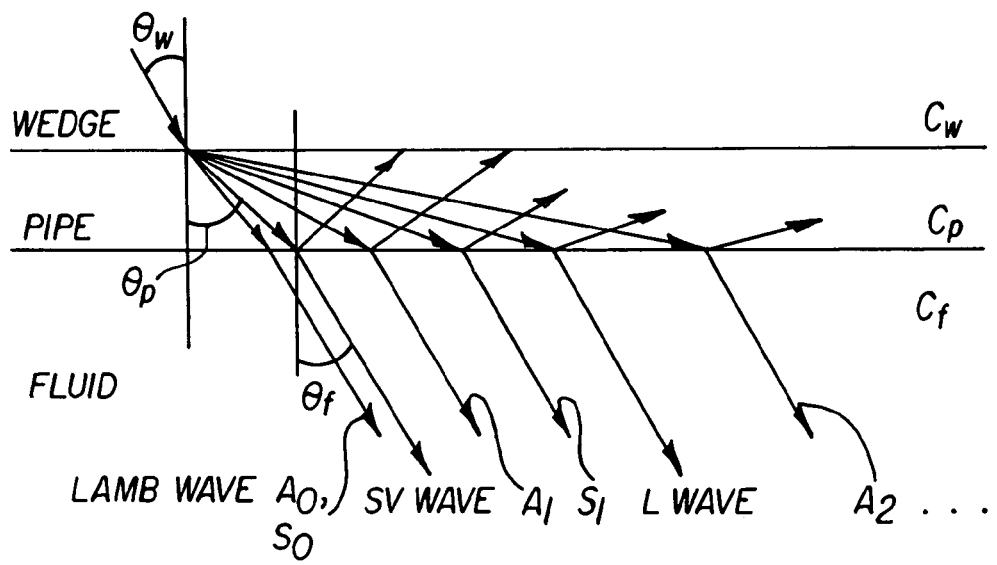
FIG. 1 is a diagram showing propagation of an ultrasonic wave diagonally incident onto a pipe with an angle of incidence not more than the critical angle for a longitudinal wave in the pipe.
Figure 2:
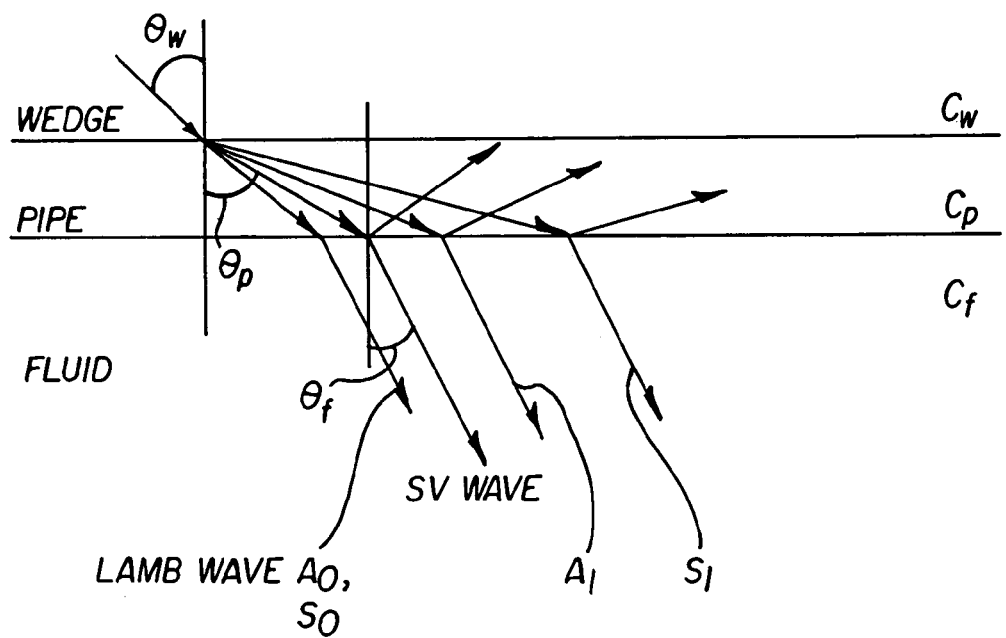
FIG. 2 is a diagram showing propagation of an ultrasonic wave diagonally incident onto a pipe with an angle of incidence not less than the critical angle for a longitudinal wave in the pipe and not more than the critical angle for a shear wave in the pipe.

FIGS. 1 and 2 each schematically illustrate a dispersion model of Lamb wave when an ultrasonic wave is diagonally incident onto a plate (pipe) and propagates in the plate. FIG. 1 shows the case in which an angle of incidence $\theta_w$ onto the pipe is less than or equal to the critical angle for a longitudinal wave in the pipe. FIG. 2 shows the case in which the angle of incidence $\theta_w$ is greater than or equal to the critical angle for a longitudinal wave in the pipe, but less than or equal to the critical angle for a shear wave in the pipe.

According to the studies carried out by the present inventors, a plurality of Lamb waves are deemed to be induced in the pipe with their frequencies kept at a constant frequency due to the difference in phase velocities ($\omega/k$, where $\omega$ is the angular frequency and $k$ is the wave number) when an ultrasonic wave is incident onto the wedge and to the pipe. With the angle of incidence $\theta_w$ less than or equal to the critical angle for a longitudinal wave in the pipe as shown in FIG. 1, antisymmetric Lamb waves with modes $A_m$ and symmetric Lamb waves with modes $S_m$ (m represents the successive orders of the mode corresponding to the difference in wavelength, given as m=0, 1, 2, ... ), each having a wave length determined by the later explained characteristic equation, are induced in addition to an L wave (longitudinal wave) and an SV wave. Part of the induced antisymmetric and symmetric Lamb waves is incident onto the fluid. Moreover, as shown in FIG. 2, with the angle of incidence $\theta_w$ being greater than or equal to the critical angle for a longitudinal wave in the pipe, but less than or equal to the critical angle for a shear wave in the pipe, in addition to the SV wave, the Lamb waves with the modes $A_m$ and the modes $S_m$ are induced in the same way, part of which being incident onto the fluid.

According to the reference, Cho-onpa Benran Henshu lin-kai (Ultrasonics Handbook Editorial Committee), Ed., Cho-onpa Benran (Ultrasonics Handbook), pp. 63-65, Maruzen Co., Ltd. (in Japanese), the characteristic equations of Lamb waves are expressed by the following expressions (4)-(7):

$$\beta_1^2 = (-\beta_2)^2 = (\omega/V_l)^2 - k^2 \quad (4)$$

$$\beta_3^2 = (-\beta_4)^2 = (\omega/V_s)^2 - k^2 \quad (5)$$

$$\tan(\beta_1 d/2)/\tan(\beta_3 d/2) = -(k^2 - \beta_3^2)^2/(4k^2\beta_1\beta_3): \text{antisymmetric mode} \quad (6)$$

$$\tan(\beta_3 d/2)/\tan(\beta_1 d/2) = -(k^2 - \beta_3^2)^2/(4k^2\beta_1\beta_3): \text{antisymmetric mode} \quad (7),$$

where $\beta_1$ to $\beta_4$ are sound propagation coefficients, d is the wall or plate thickness, $\omega$ is the angular frequency, $V_l$ is the sound velocity of the longitudinal wave, $V_s$ is the sound velocity of the shear wave, and k is the wave number.

By the above characteristic equations, about each mode m ($m^{th}$ order) of the symmetric Lamb waves and the antisymmetric Lamb waves, relations between their frequencies and their wavelengths can be calculated. Moreover, the phase velocity $V_p$ and the group velocity $V_g$ as an actual propagation velocity of a wave packet (in general, $V_g \neq V_p$, and without presence of a dispersion phenomenon, $V_g = V_p$) can be obtained by the following expressions (8) and (9):

$$V_p = \omega/k \quad (8)$$

$$V_g = \partial\omega/\partial k \quad (9).$$

Furthermore, from the above phase velocity and Snell's law, an angle of refraction $\theta_p$ of each mode of the Lamb wave at the pipe can be calculated.

Figure 3:
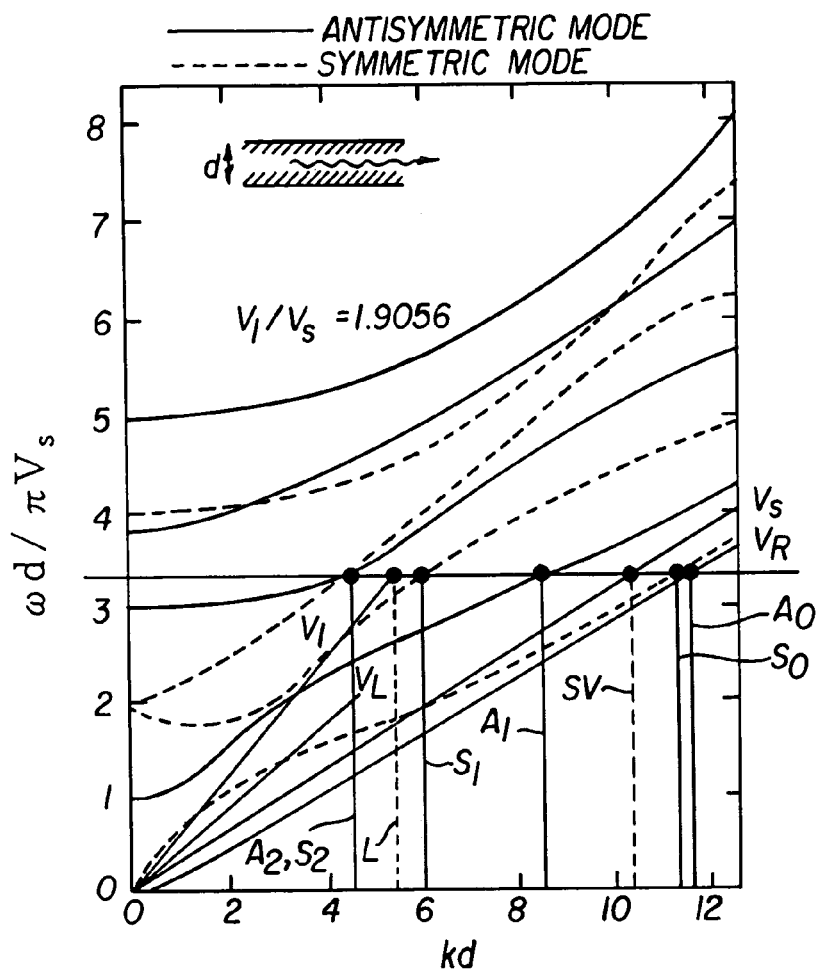
FIG. 3 is a diagram showing examples of dispersion curves of Lamb waves.

FIG. 3 illustrates a diagram of examples of dispersion curves ($\omega$–$k$ dispersion curves) of Lamb waves obtained by solving the above characteristic equations, as illustrated on page 64 of the previously mentioned reference. Each solid line represents a dispersion curve of each mode $A_m$ of the antisymmetric Lamb wave and each broken line represents a dispersion curve of each mode $S_m$ of the symmetric Lamb wave. The horizontal axis in FIG. 3 corresponds to the wave number of an ultrasonic wave and the vertical axis corresponds to the transmitted frequency of the ultrasonic wave. A mode of Lamb wave induced at a transmitted frequency, a pipe wall thickness, and a sound velocity in a pipe is the mode of a dispersion curve intersecting a horizontal line (orthogonal to the vertical axis) at a point with a value corresponding to the transmitted frequency. However, actually induced modes are limited to those in the case in which a critical angle determined by the sound velocity in the wedge and the phase velocities of every mode is larger than the angle of incidence $\theta_w$ onto the pipe.

The exact solutions about the frequency and the wavelength in each mode of Lamb wave are obtained by solving the previously explained characteristic equations. However, when a product kd of a wave number k and a wall thickness d is large, the calculation can be practically simplified by substituting asymptotic solutions for exact solutions. Namely, a phase velocity $V_p$ asymptotically approaches the phase velocity $V_R$ of Rayleigh wave for the zero order mode (m=0) as is expressed in the following expression (10). While, for the higher order modes (m=1, 2, ... ), the velocity $V_p$ asymptotically approaches each solution (a sound velocity $V_s$ of the shear wave) of the characteristic equations of the shear waves of the corresponding modes as are expressed in the following expressions (11):

$$V_p^{(AO)} = V_p^{(SO)} = V_R (m=0) \quad (10)$$

$$V_p^{(Am)} = \omega/\{(\omega/V_s)^2 - (2m\pi/d)^2\}^{1/2}$$

$$V_p^{(Sm)} = \omega/\{(\omega/V_s)^2 - ((2m+1)\pi/d)^2\}^{1/2} (m=1, 2, ... ) \quad (11),$$

where superscripts Am and Bm represent an $m^{th}$ order mode of the antisymmetric Lamb wave and that of the symmetric Lamb wave, respectively. Moreover, because of presence of an approximate solution in the equation about the phase velocity of the Rayleigh wave, in applying the above expression (10), the approximate solution is practically substituted for the exact solution to simplify the calculation.

The reference Katsuo Negishi et al., Cho-onpa Gijutsu (Ultrasonics Technology), pp. 173-174, Tokyo Daigaku Shuppan-kai (Publication Association of University of Tokyo) (in Japanese) describes that the exact solution for the phase velocity $V_R$ of Rayleigh wave can be obtained as the solution of the following expression (12) by setting L and S as follows:

$$L = \{1 - (V_R/V_l)^2\}^{1/2}, \quad S = \{1 - (V_R/V_s)^2\}^{1/2}.$$

Furthermore, it describes that the approximate solution is expressed by the following expression (13) by letting Poisson ratio be $\sigma$:

$$4LS - (1+S^2)^2 = 0 \quad (12)$$

$$V_R = V_S(0.87 + 1.12\sigma)/(1+\sigma) \quad (13).$$

Figure 4:
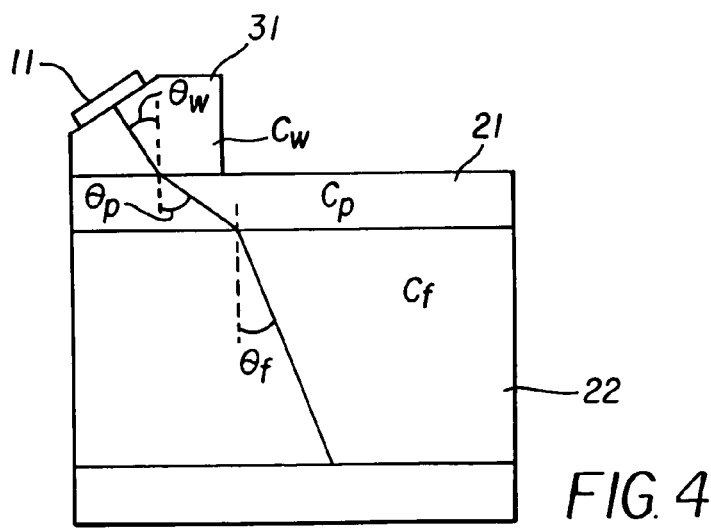
FIG. 4 is a schematic view showing an arrangement of an ultrasonic flow velocity profile meter embodying the present invention.

FIG. 4 schematically illustrates an arrangement of an ultrasonic flow velocity profile meter embodying the present invention. The arrangement shown in FIG. 4 includes an ultrasonic wave transducer 11, a wedge 31, and a pipe 21, which can be stainless steel. The relationship between the transmitted frequency of the ultrasonic wave and an angle of refraction $\theta_p$ for each mode of Lamb wave was calculated using the following expressions (14) and (15), and using the asymptotic solutions for the phase velocities expressed as the expressions (10) and (11) and Snell's law when an angle of incidence $\theta_w$ onto the pipe 21 is set not less than the critical angle for the longitudinal wave in the pipe 21 and not more than the critical angle for the shear wave (equivalent to the case shown in FIG. 2):

$$\theta_p^{(Am)} = \sin^{-1}(V_p^{(Am)}/C_w \cdot \sin\theta_w)$$

$$\theta_p^{(Sm)} = \sin^{-1}(V_p^{(Sm)}/C_w \cdot \sin\theta_w) \quad (14),$$

where $C_w$ is the sound velocity in the wedge 31.

Figure 5:
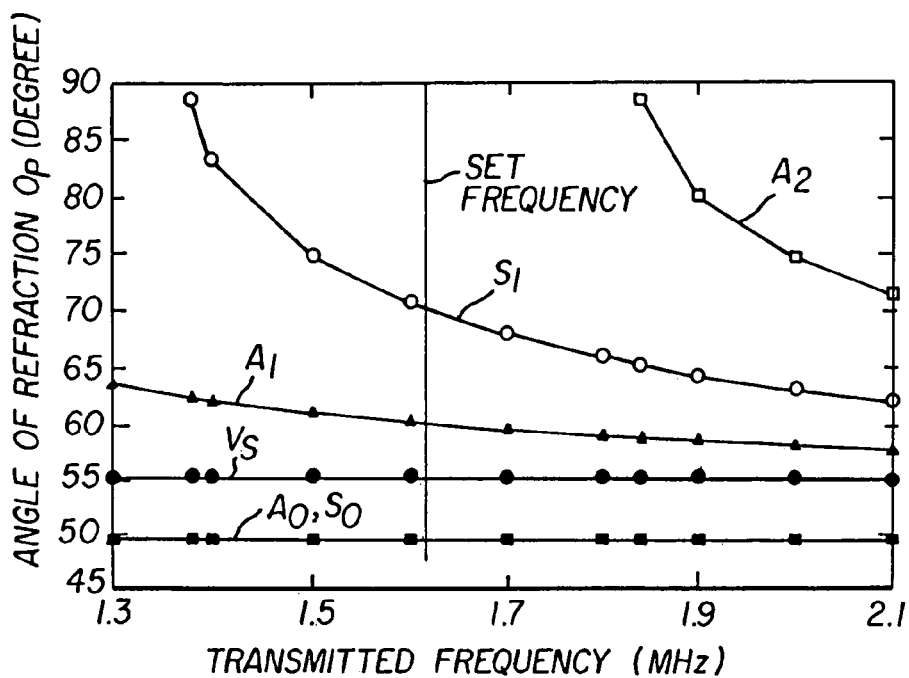
FIG. 5 is a graph showing a relationship between a transmitted frequency and an angle of refraction for each mode of Lamb wave.
Figure 6:
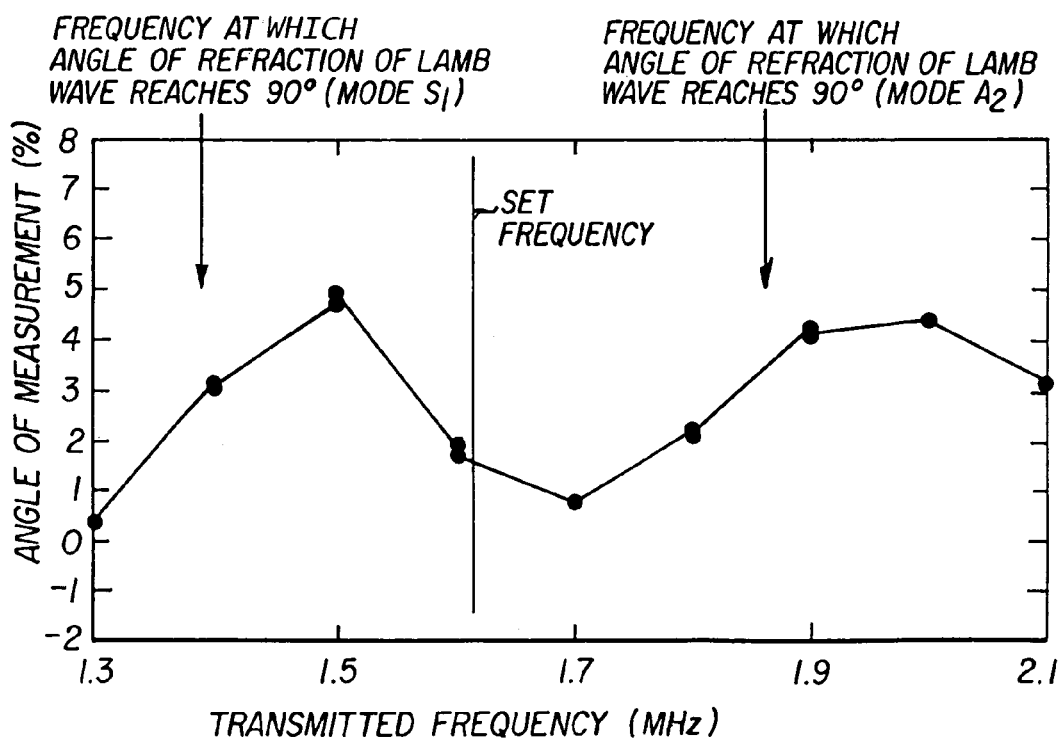
FIG. 6 is a diagram showing a relationship between a transmitted frequency and an error of flow rate measurement.

FIG. 5 is a graph showing the relationship between the transmitted frequency and the angle of refraction for each mode of Lamb wave calculated by using above expression. Using the pipe 21 similar to the above, the relationship between the transmitted frequency and an error of flow rate measurement was measured. The result is shown in FIG. 6. FIGS. 5 and 6 indicate that the measurement error reaches the maximum around the frequency $f_{critical}$ at which angles of refraction $\theta_p^{(Am)}$ and $\theta_p^{(Sm)}$ of Lamb wave in a certain order of a mode (for example, $A_2$, $S_1$) become 90°. Here, the above frequency $f_{critical}$ can be obtained by the following expressions (15). The expressions (15) are derived by taking $\theta_p^{(Am)}$ and $\theta_p^{(Sm)}$ in the expressions (14) as $\theta_p^{(Am)} = \theta_p^{(Sm)} = 90°$, substituting $V_p^{(Am)}$ and $V_p^{(Sm)}$ in the expressions (11) for those in the expressions (14), and then solving the expressions (14) for $\omega$ ($=2\pi f$):

$$f_{critical}^{(Am)} = m/\{(1/V_s)^2 - (\sin\theta_w/C_w)^2\}^{1/2}/d \ (m=1,2,\ldots)$$

$$f_{critical}^{(Sm)} = (2m+1)/\{(1/V_s)^2 - (\sin\theta_w/C_w)^2\}^{1/2}/d/2$$
$$(m=1, 2, \ldots) \quad (15).$$

Setting the transmitted frequency of the ultrasonic wave at a frequency other than the above frequency $f_{critical}$ prevents the flow-rate measurement error from reaching around the maximum.

In FIGS. 5 and 6, the set frequency is shown at the intermediate point between two frequencies at which the angles of refraction $\theta_p^{(A2)}$ and $\theta_p^{(S1)}$ of modes $A_2$ and $S_1$ of Lamb wave reach 90°, respectively. At the intermediate point, the measurement error reaches around the minimum. At the intermediate point between the frequencies at which the angles of refraction $\theta_p^{(A2)}$ and $\theta_p^{(S1)}$ of two successive modes of $A_2$ and $S_1$ of Lamb wave reach 90°, respectively, there exists a frequency at which the measurement error is reduced to around the minimum. Therefore, by setting the frequency at the intermediate point as the transmitted frequency, it becomes possible to reduce the measurement error to around a minimum.

Each mode of Lamb wave has a different propagation time $\tau$ in the pipe due to difference in angle of refraction $\theta_p$ in the pipe caused by difference in phase velocity, and due to difference in group velocity $V_g$. Here, group velocities $V_g$ as asymptotic solutions for various modes of Lamb wave are shown in the following expressions (16). Moreover, the propagation time $\tau$ in the pipe becomes different depending on the group velocity $V_g$ as expressed in the following expressions (17):

$$V_g^{(AO)} = V_g^{(SO)} = V_R$$

$$V_g^{(Am)} = V_s^2/V_p^{(Am)}$$

$$V_g^{(Sm)} = V_s^2/V_p^{(Sm)} \quad (16)$$

$$\tau^{(Am)} = d/\cos\theta_p^{(Am)}/V_g^{(Am)}$$

$$\tau^{(Sm)} = d/\cos\theta_p^{(Sm)}/V_g^{(Sm)} \quad (17).$$

Therefore, the echo is received in a form in which, on the echo of the ultrasonic wave following the primary principle expression (for example, the SV wave of the shear wave and the L wave of the longitudinal wave), echoes of other Lamb waves (interference waves) are superposed with their respective timings shifted. Thus, the obtained flow velocity profile has current profiles derived from various modes of Lamb waves superposed on the original flow velocity profile. This causes a flow-velocity profile measurement error, resulting in a flow-rate measurement error.

The following expression (18) expresses a propagation time T of Lamb wave in fluid (in water), where D is the inner diameter of a pipe. Due to the propagation time T in fluid and propagation times $\tau$ in a pipe, each mode of Lamb wave causes a positional difference in the radial direction as is expressed in each of the following expressions (19):

$$T = D/\cos\theta_f/V_f \quad (18)$$

$$r^{(Am)}/R = 2(\tau^{(Am)} - \tau^{(Vs)})/T$$

$$r^{(Sm)}/R = 2(\tau^{(Sm)} - \tau^{(Vs)})/T \quad (19),$$

where R is the radius ($=D/2$) of the pipe having the inner diameter D, and r is the distance ($r \leq R$) along the radius R from the center of the pipe.

Figure 7:
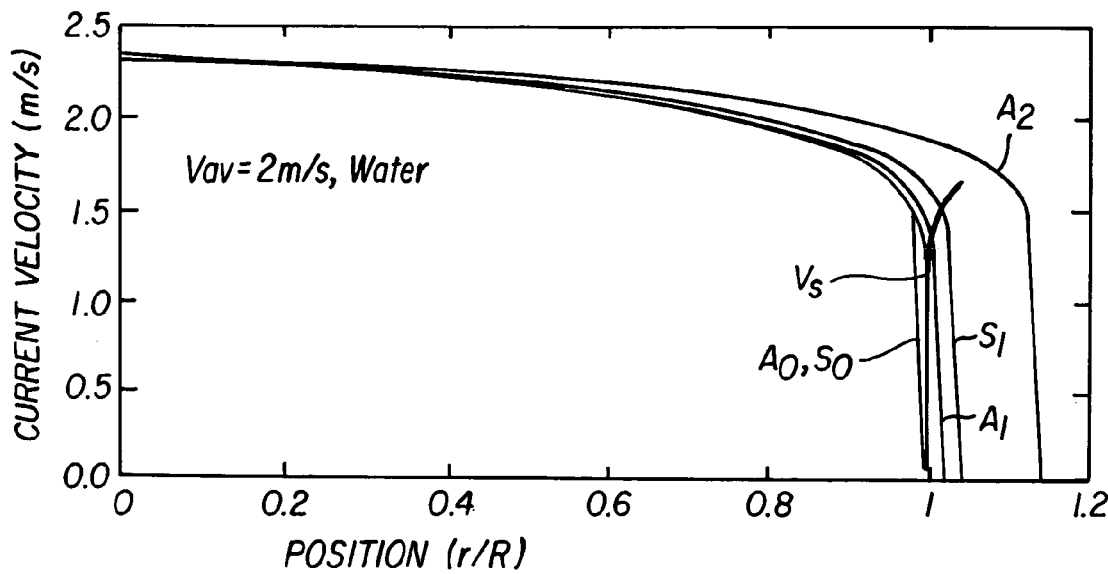
FIG. 7 is a diagram showing flow velocity profiles of water each measured about each of modes of Lamb wave.

FIG. 7 is a diagram showing the flow velocity profiles of water each measured about each of modes $A_O$ to $A_2$, $S_O$ and $S_1$ of Lamb wave, and the SV wave ($V_S$) as the shear wave. The horizontal axis represents the position relative to the radius of the pipe from the center of the pipe in the direction of the radius and the vertical axis represents the measured value of the flow velocity. In the measurement, the averaged flow velocity of water is 2 m/s. It is known from FIG. 7 that the flow velocity profile is different depending on each of the modes $A_O$ to $A_2$, $S_O$ and $S_1$, and positional differences occur in the radial direction for the same flow velocity, which cause measurement errors. Moreover, referring to FIG. 8, which illustrates the result of flow rate error calculation carried out using a model that is the same as the pipe used for obtaining the flow velocity profiles shown in FIG. 7, the error reaches the maximum around the frequencies of $f_{critical}$ (around 1.4 MHz and 1.9 MHz) at each of which an angle of refraction of Lamb wave reaches 90°.

Furthermore, the following expressions (20) are for calculating the flow velocity profile of a turbulent flow for obtaining the flow velocity profiles shown in FIG. 7. Moreover, the following expressions (21) are for calculating the flow rate error shown in FIG. 8. Here, in FIG. 8, errors in all of modes of Lamb wave can be simply averaged.

$$V(r) = V_{max}\{1 - (r - r^{(Am)})/R\}^{1/n},$$

or $$V(r) = V_{max}\{1 - (r - r^{(Sm)})/R\}^{1/n}$$

$$n = 2.1 \log Re - 1.9$$

$$Re = V_{av}D/\nu \quad (20),$$

where, Re is Reynolds number, $V_{max}$ is the maximum flow velocity, $V_{av}$ is an averaged flow velocity, and $\nu$ is a kinematic viscous coefficient:

$$\Delta Q^{(Am)}/Q_o = \{(2n+1)/n\}\{2r^{(Am)}/R - (r^{(Am)}/R)^{1+1/n}\} + \quad (21)$$
$$(1 - r^{(Am)}/R)^{2+1/n} - (r^{(Am)}/R)^{2+1/n} - 1$$
$$\Delta Q^{(Sm)}/Q_o = \{(2n+1)/n\}\{2r^{(Sm)}/R - (r^{(Sm)}/R)^{1+1/n}\} +$$
$$(1 - r^{(Sm)}/R)^{2+1/n} - (r^{(Sm)}/R)^{2+1/n} - 1$$
$$\Delta Q/Q_o = \sum (\Delta Q^{(Am)} + \Delta Q^{(Sm)})/Q_o/N,$$

where N is the number of modes.

Figures 9, 10:
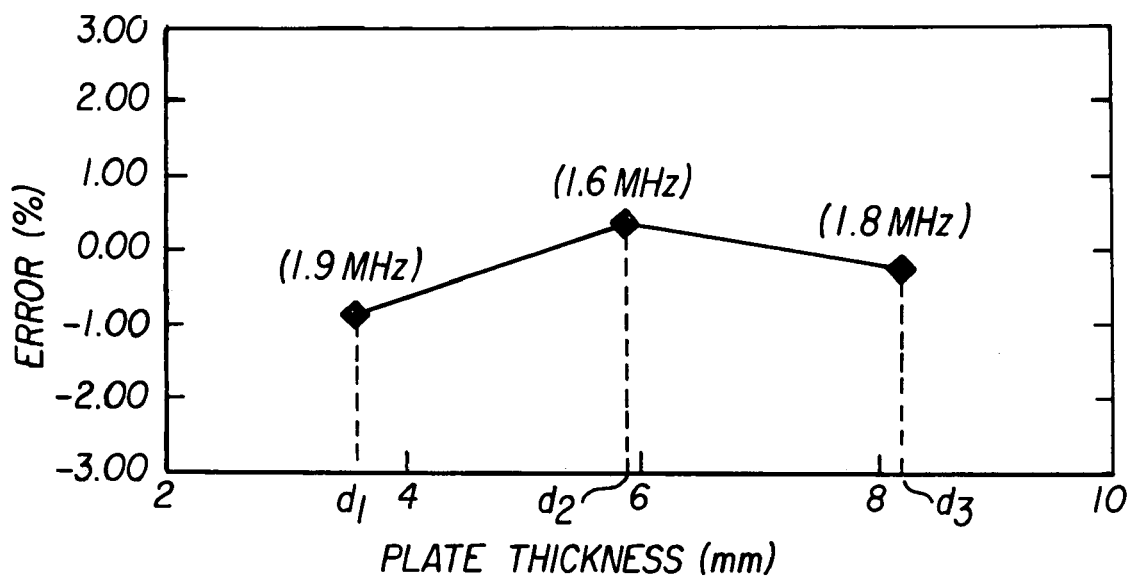
FIG. 9 is a diagram showing a relationship between a wall thickness of a pipe and an error of flow rate measurement.
FIG. 10 is a list showing examples of frequencies by pipe wall thickness, at each of which frequencies an angle of refraction for each mode of Lamb wave reaches 90°, the frequencies being calculated out as asymptotic solutions of characteristic equation of Lamb wave.

In addition, by using three kinds of pipes made of stainless steel each with a different thickness, the relationship between the wall thickness and the flow rate error was measured. In the measurement, as a transmitted frequency, the frequency was set at around the intermediate point between two frequencies. At each of the two frequencies, the angle of refraction $\theta_p$ of Lamb wave in each of two successive modes, such as the previously described modes $A_1$ and $S_1$ of Lamb wave, reaches 90°. The results are shown in FIG. 9, where frequencies of 1.9 MHz, 1.6 MHz, and 1.8 MHz are set transmitted frequencies corresponding to wall thicknesses $d_1$, $d_2$, and $d_3$, respectively. According to FIG. 9, it becomes possible to reduce each measurement error regardless of the thickness of the pipe.

Furthermore, as another way of suppressing frequency dependence besides as explained above, a transmitted frequency is made lower than the frequency at which an angle of refraction $\theta_p$ of an antisymmetric Lamb wave in a first order mode $A_1$ reaches 90°. At a frequency lower than the frequency at which the angle of refraction $\theta_p$ reaches 90°, no mode $A_1$ is generated. Further, only the SV wave and zero order modes of $A_O$ and $S_O$ of Lamb wave are generated, by which the frequency dependence can be considerably suppressed.

FIG. 10 is a list showing examples of results of calculations about frequencies at each of which an angle of refraction $\theta_p$ for each mode of Lamb wave reaches 90°. The frequencies were obtained for various wall thicknesses of pipes as asymptotic solutions of the characteristic equation of Lamb wave. As the order of a mode m of Lamb wave increases, the frequency becomes higher at which an angle of refraction of Lamb wave reaches 90°. It is therefore known that a transmitted frequency made lower than the frequency, at which the angle of refraction $\theta_p$ of the above-described mode $A_1$ reaches 90°, causes no generation of all of Lamb waves with modes of first order and above.

Moreover, as another way of suppressing frequency dependence, an angle of incidence of an ultrasonic wave onto the pipe is be made larger than the critical angle for an antisymmetric Lamb wave of the first order mode $A_1$. As the order of the mode of Lamb wave becomes higher, the phase velocity of Lamb wave becomes faster and the critical angle becomes smaller. Therefore, an ultrasonic wave, made incident at an angle of incidence larger than the critical angle for the antisymmetric Lamb wave of the first order mode $A_1$, causes no generation of Lamb waves with modes of first order and above to considerably suppress frequency dependence.

Furthermore, a way of lowering the transmitted frequency lower than the cut-off frequency of the antisymmetric Lamb wave of the first order mode $A_1$ can be also considered. The cut-off frequency is a frequency at which the phase velocity becomes infinity and the group velocity becomes zero (the value at kd=0 in the diagram in FIG. 3, i.e., an intercept on the vertical axis). At a frequency lower than the cut-off frequency, no Lamb wave of the mode $A_1$ is generated regardless of the angle of incidence $\theta_w$. The cut-off frequency becomes higher as the order of the mode becomes higher. Therefore, at a frequency lower than the cut-off frequency of Lamb wave of the mode $A_1$, no higher mode than the mode $A_1$ is generated, which considerably suppresses frequency dependence regardless of the angle of incidence $\theta_w$.

Figure 8:
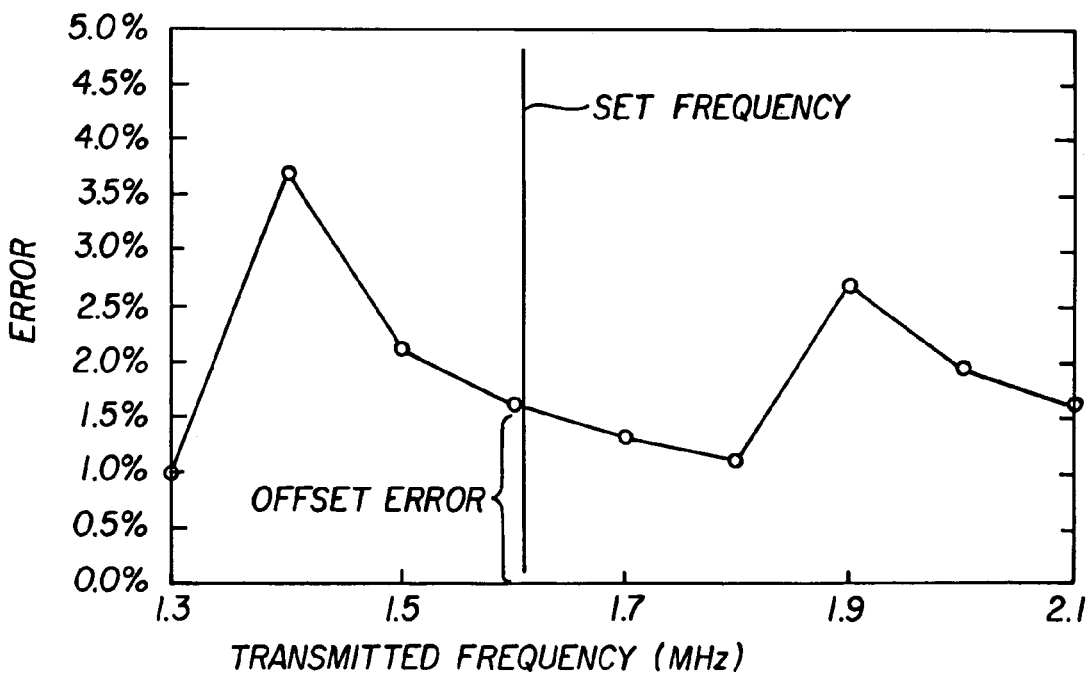
FIG. 8 is a diagram showing a result of calculation about a relationship between a transmitted frequency and a flow rate error.

Incidentally, as shown in previously presented FIGS. 6 and 8, even when the set frequency is taken as a frequency approximately in the middle of the frequencies at which the respective angles of refraction $\theta_p$ of two successive modes of Lamb wave reach 90°, offset errors occur, as shown in FIG. 8. The offset error can be cancelled by carrying out calibration of an ultrasonic wave transducer with an actual flow at a reference pipe as described in Japanese Patent Application No. 2004-50998. The calibration with the actual flow described in the Japanese Patent Application No. 2004-50998 is proposed for suppressing variations in $\theta_w$ and $C_w$.

Figure 11:
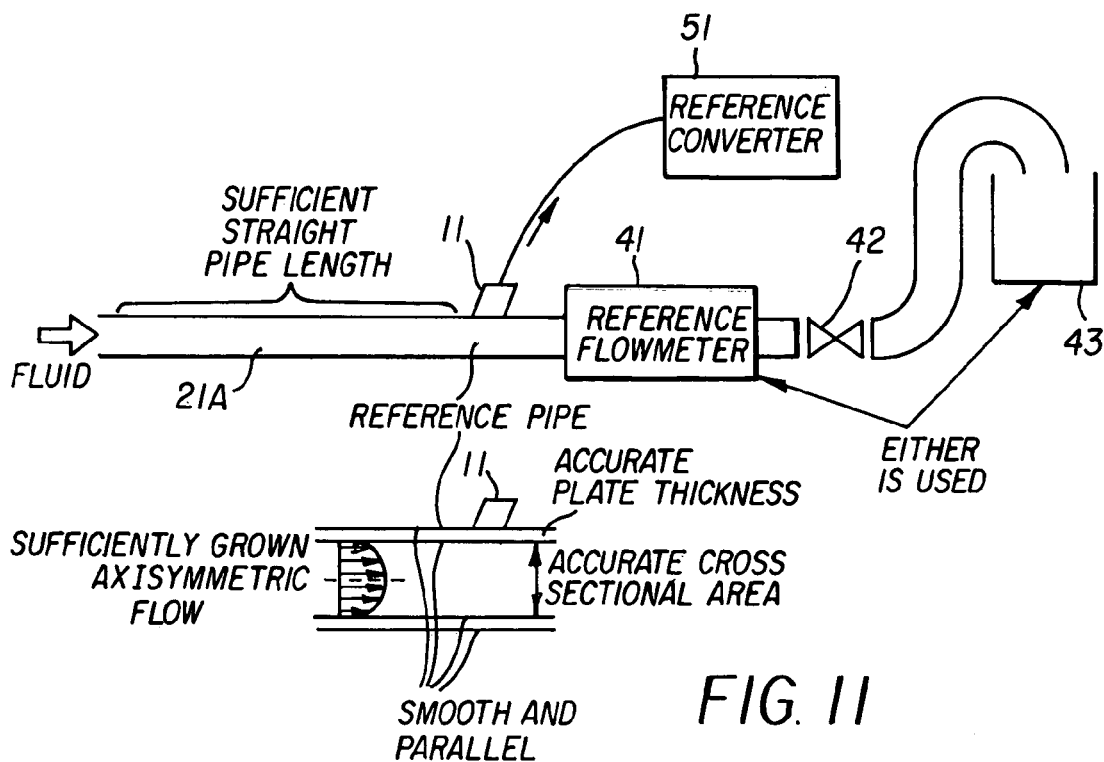
FIG. 11 is a diagram showing an arrangement of a calibration facility with an actual flow.
Figure 12:
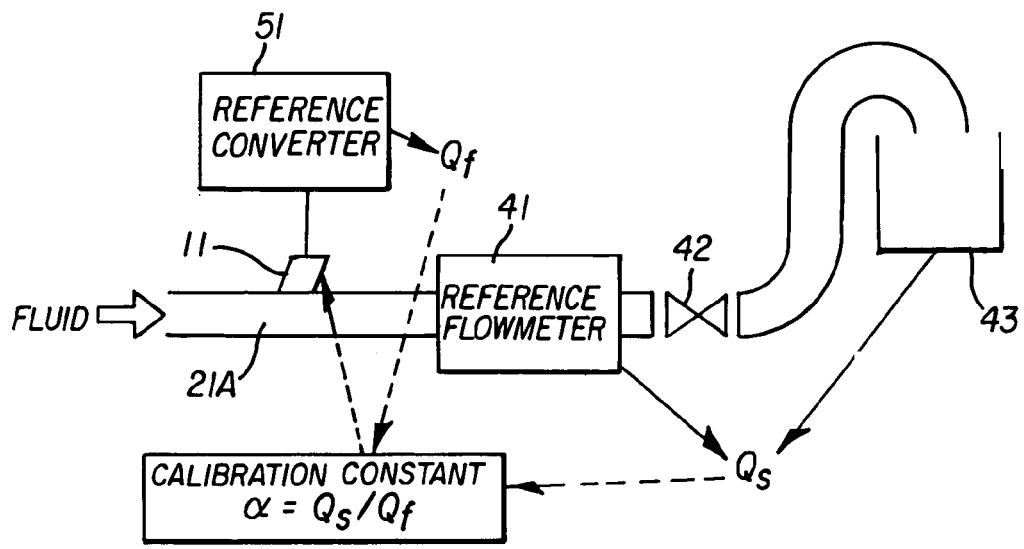
FIG. 12 is a diagram illustrating the operation of the calibration facility shown in FIG. 11.
Figure 16:
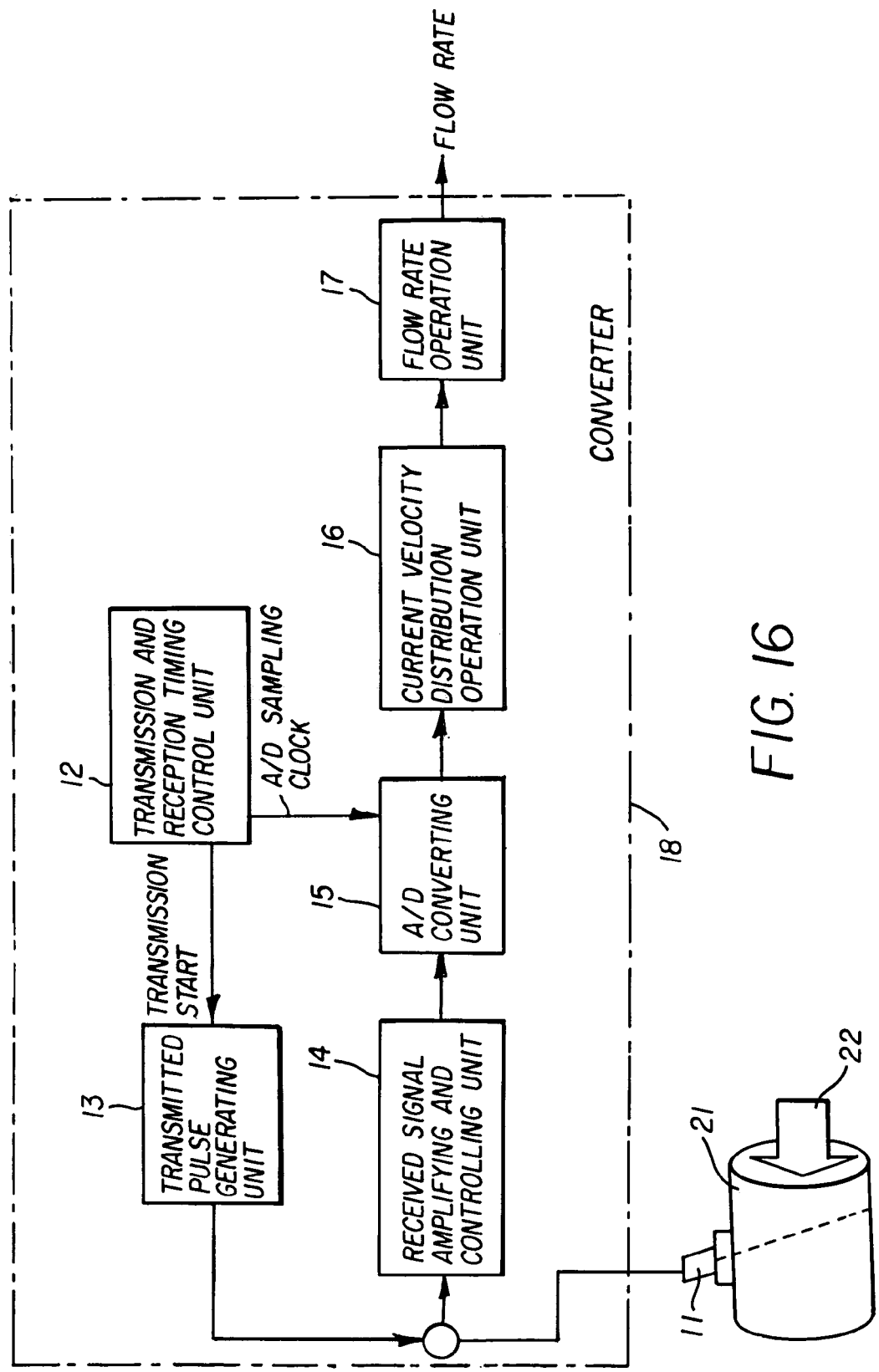
FIG. 16 is a block diagram showing the arrangement of the clamp-on Doppler ultrasonic flow velocity profile meter.

FIG. 11 schematically illustrates an arrangement of a calibration facility with an actual flow presented in the above Japanese Patent Application No. 2004-50998. FIG. 12 schematically illustrates the operation of the calibration facility. The calibration facility with an actual flow is provided with a reference pipe 21A, a reference flow meter 41, a flow control valve 42, and a reference converter 51. The reference converter 51 can be same as the converter 18 presented FIG. 16. The reference pipe 21A has an inner face processed to have an accurate cross sectional area A. The inner face is smoothly finished over a sufficiently long straight pipe length so that a flow of fluid in the pipe sufficiently grows into an axisymmetric flow. Moreover, the outer face of the reference pipe 21A is also smoothly finished to be parallel with the inner face. Thus, the flow rate of the fluid flowing in the reference pipe 21A can be accurately established or controlled by adjusting the opening of the flow control valve 42 while the flow rate is monitored by the reference flow meter 41. For accurately controlling the fluid flow rate, a reference tank 43 can be used instead of the reference flow meter 41 to accurately measure the amount of fluid flowing through the reference flow meter 41 and store in the reference tank 43.

The ultrasonic wave transducer 11 is mounted on and secured to the reference pipe 21A. The reference converter 51 is connected to the ultrasonic wave transducer 11 to calculate the flow velocity and the flow rate. The measurements are made with a known (true) flow rate $Q_s$ accurately set by the reference flow meter 41 and the flow control valve 42. On the basis of the flow rate $Q_f$ measured and the known flow rate $Q_s$, an actual flow calibration constant $\alpha$ of the ultrasonic wave transducer 11 is calculated as $\alpha=Q_s/Q_f$. The calibration constant $\alpha$ is stored in an ultrasonic flow meter using the transducer 11 as the constant characteristic of the transducer 11 for carrying out calibration of the measured flow rate.

According to the previously-mentioned Japanese Patent Application No. 2004-50998, the angle of refraction $\theta_f$ at the boundary plane between the pipe and the fluid and the sound velocity $C_f$ in the fluid in the previously presented expression (2) are substituted with the angle of incidence $\theta_w$ onto the pipe and the sound velocity $C_w$ in the wedge according to Snell's law presented as the following expression (22). Thus, the expression (2) becomes the following expression (23):

$$C_f/\sin\theta_f = C_p/\sin\theta_p = C_w/\sin\theta_w \qquad (22)$$

$$V_f(x) = (C_w \cdot f_d(x))/(2\cdot\sin\theta_w \cdot f_O) \qquad (23).$$

In Japanese Patent Application No. 2004-50998, for obtaining the fluid flow velocity $V_f(x)$ given by the expression (23) with high accuracy, $\theta_w$ and $C_w$ are corrected with the calibration with the actual flow. In the present invention, not only $\theta_w$ and $C_w$, but also the offset error is corrected together with the calibration with the actual flow using the reference flow meter 41 or the reference tank 43. With the measured flow rate by using the reference flow meter 41 taken as $Q_s$, the ratio of $Q_s$ to the flow rate $Q_f$ based on the flow velocity profile measured by the ultrasonic wave transducer 11, is taken as an actual flow calibration constant $\alpha$. At this time, $Q_s$ can be expressed by the following expression (24):

$$Q_s = \alpha \cdot Q_f = \int \{\alpha(C_w \cdot f_d(x))/(2\cdot\sin\theta_w \cdot f_O)\} \cdot dA \qquad (24).$$

Figure 13:
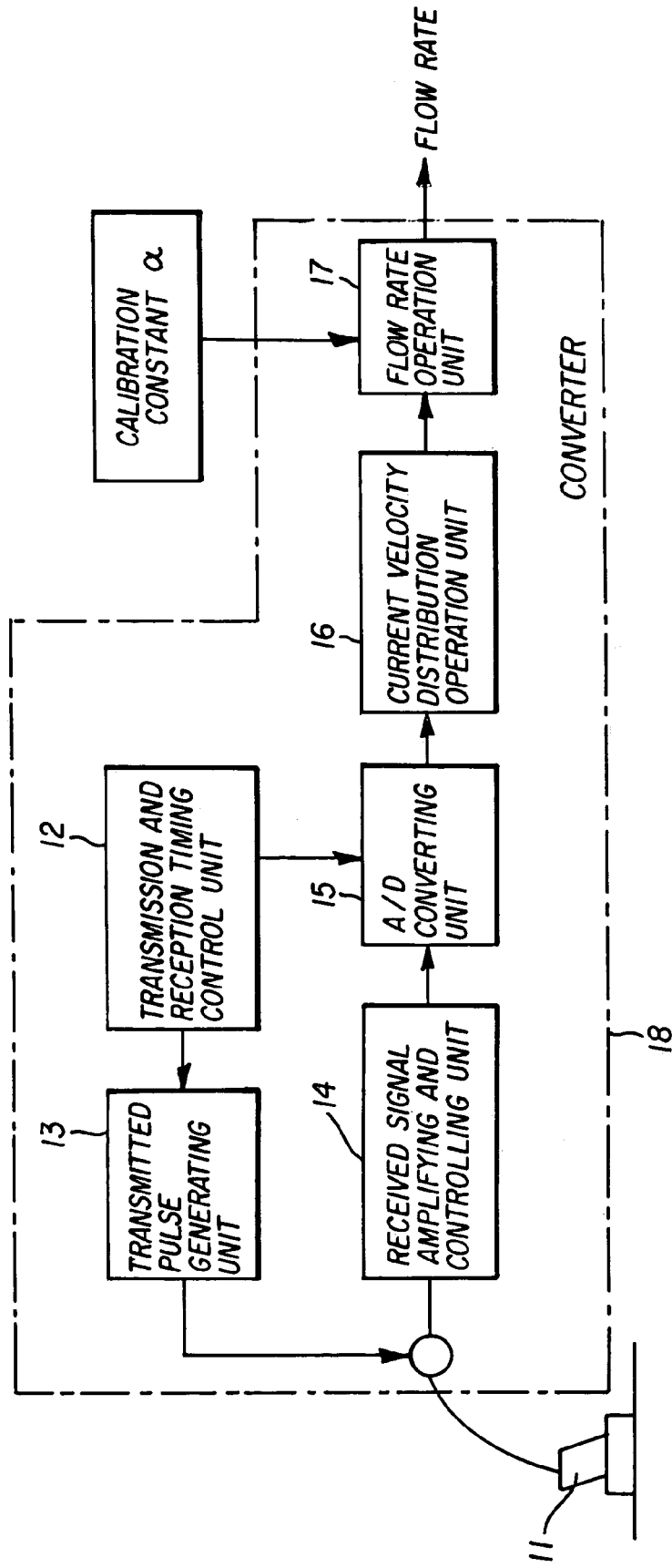
FIG. 13 is a schematic illustration of the calibration with an actual flow embodied in the present invention.
Figure 14:
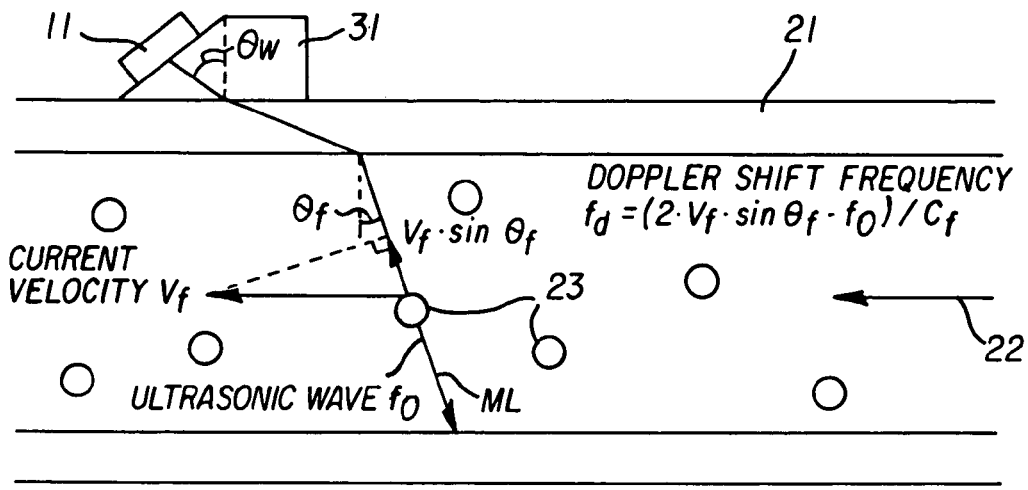
FIG. 14 is a diagram illustrating the operation principle of a Doppler ultrasonic flow velocity profile meter.
Figure 15:
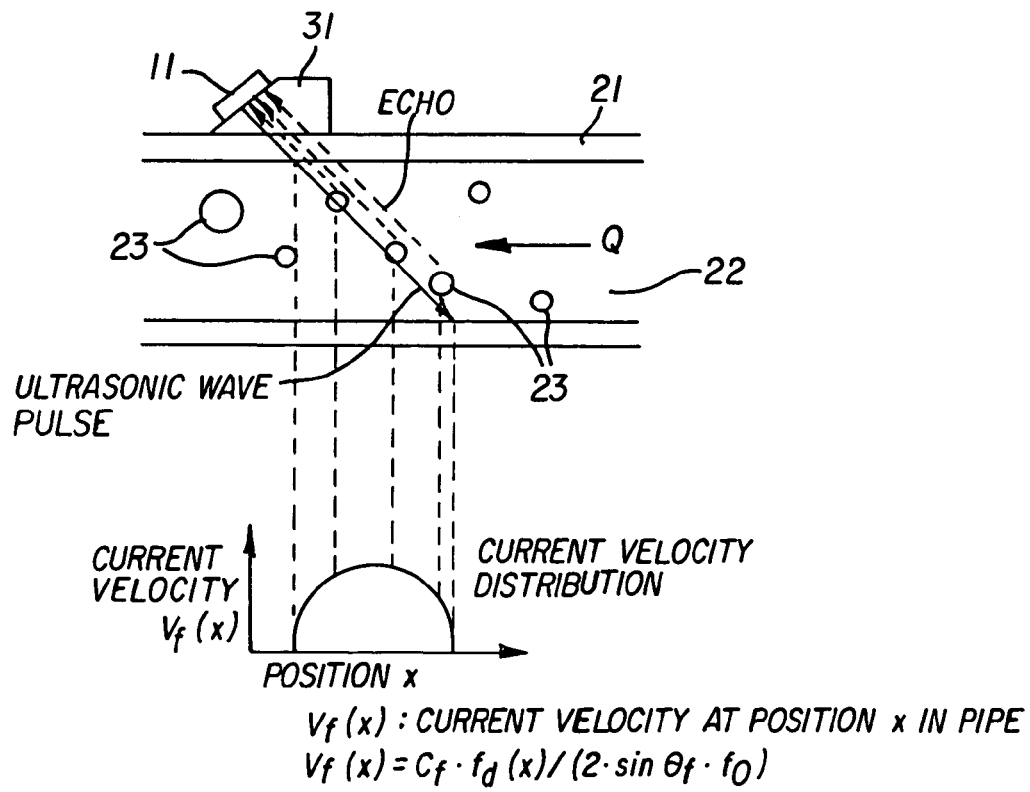
FIG. 15 is a diagram for explaining the principal part of the flow velocity profile meter shown in FIG. 14 and a flow velocity profile in a pipe.

In FIG. 13, as a conceptual illustration of the calibration with the actual flow in the embodiment of the invention, the flow rate $Q_f$ measured using the ultrasonic wave transducer 11 and a converter 18, is multiplied by the actual flow calibration constant $\alpha$. This allows the measured value of the flow rate to be obtained with the same high accuracy as that of the flow rate measured by the reference flow meter 41. Therefore, without separately measuring and correcting $\theta_w$, $C_w$, and the offset error, they can be simultaneously corrected by using only one calibration constant $\alpha$. With the calibration constant $\alpha$ taken as a constant characteristic of each ultrasonic wave transducer 11, with the constant shown on its nameplate or other means of identifying the constant to the user, the measured flow rate is multiplied by the characteristic calibration constant $\alpha$ shown on the transducer 11 being used. This allows a highly accurate flow rate to be obtained even when the combination of the transducer 11 and the converter 18 is changed, by which interchangeability between transducers can be ensured.

Moreover, as another way of correcting the offset error, calculated values of errors shown in FIG. 8 can be used with or without the calibration with the actual flow. Furthermore, when a pipe with different material and wall thickness from those of the reference pipe 21A is used, the correction can be made by using results of calculation carried out about the difference in the offset error from the offset error using the reference pipe 21A.

The present invention can be also applied to the previously explained ultrasonic wave flow velocity profile meter disclosed in Japanese Patent Application No. 2003-396755. In the ultrasonic flow velocity profile meter, as already explained, the ultrasonic wave transducer is secured to the wedge while being inclined to the pipe by taking the angle of incidence of the ultrasonic wave incident on the pipe from the wedge as being no less than the critical angle for a longitudinal wave in the pipe and no more than the critical angle for the shear wave in the pipe. This is provided so that only the shear wave is propagated in the pipe when the sound velocity of the shear wave of an ultrasonic wave propagated in a pipe is equal to or more than the sound velocity of the longitudinal wave in a wedge. Also in this case, the frequency dependence in measured flow velocity and flow rate caused by Lamb wave can be reduced.

Adequately setting of the transmitted frequency of an ultrasonic wave and the angle of incidence of the ultrasonic wave to the pipe enables realization of a clamp-on Doppler ultrasonic flow velocity profile meter can reduce the frequency dependence of a measured value due to Lamb wave, to reduce the measurement error. Moreover, the actual flow calibration of the ultrasonic wave transducer allows the offset error to be cancelled, allowing interchangeability between transducers to be ensured, by which a high accuracy can be maintained even when the combination with a converter is changed.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

This application is based on, and claims priority to, Japanese Application No. 2004-210965, and the disclosure of the priority application, in its entirety, including the drawings, claims, and the specifications thereof, is incorporated herein by reference.

What is claimed is:

1. An apparatus for measuring a flow velocity profile of fluid flowing in a tubular member made of material that allows an acoustic wave to propagate therethrough, based on the frequency of ultrasonic wave reflected off reflectors existing in the fluid changing depending on the fluid flow velocity due to Doppler effect, comprising:
   a wedge that externally mounts to the tubular member, the wedge being made of material that allows an acoustic wave to propagate therethrough; and
   an ultrasonic wave transducer that emits ultrasonic wave mounted to the wedge at an inclination relative to the direction in which the fluid travels through the tubular member,
   wherein the frequency of the transmitted ultrasonic wave emitted by the ultrasonic wave transducer is set at a frequency other than the frequency at which an angle of refraction of a wave in each mode of Lamb wave in the tubular member becomes 90° relative to an axis extending perpendicular to the direction in which the fluid travels through the tubular member, and
   wherein the frequency at which the wave angle of refraction in each mode of lamb wave in the tubular member becomes 90° relative to the axis extending perpendicular to the direction in which the fluid travels through the tubular member is calculated from an angle of incidence of the ultrasonic wave made incident onto the tubular member from the wedge, a sound velocity in the wedge, sound velocities of a shear wave and a longitudinal wave in the tubular member, and a wall thickness of the tubular member.

2. The apparatus according to claim 1, wherein the frequency of the transmitted ultrasonic wave is around the central frequency between two frequencies at each of which an angle of refraction of a wave in each of two successive modes of Lamb wave in the tubular member becomes 90° relative to the axis extending perpendicular to the direction in which the fluid travels through the tubular member, each of the two frequencies being calculated from the angle of incidence of the ultrasonic wave made incident onto the tubular member from the wedge, the sound velocity in the wedge, the sound velocities of the shear wave and the longitudinal wave in the tubular member, and the wall thickness of the tubular member.

3. The apparatus according to claim 1, wherein the frequency of the transmitted ultrasonic wave is lower than the frequency at which an angle of refraction of a wave in a first order mode of antisymmetric Lamb wave in the tubular member becomes 90°, the frequency at which the wave angle of refraction in the first order mode of antisymmetric Lamb wave in the tubular member becomes 90° relative to the axis extending perpendicular to the direction in which the fluid travels through the tubular member being calculated from the angle of incidence of the ultrasonic wave made incident onto the tubular member from the wedge, the sound velocity in the wedge, the sound velocities of the shear wave and the longitudinal wave in the tubular member, and a wall thickness of the tubular member.

4. The apparatus according to claim 1, wherein the ultrasonic wave is made incident from the wedge onto the tubular member at an angle of incidence larger than the angle of incidence at which an angle of refraction of a wave in a first order mode of antisymmetric Lamb wave in the tubular member becomes 90° relative to the axis extending perpendicular to the direction in which the fluid travels through the tubular member.

5. The apparatus according to claim 1, wherein an asymptotic solution of a characteristic equation of Lamb wave is used as a phase velocity of the Lamb wave for determining the frequency of the transmitted ultrasonic wave.

6. The apparatus according to claim 2, wherein an asymptotic solution of a characteristic equation of Lamb wave is used as a phase velocity of the Lamb wave for determining the frequency of the transmitted ultrasonic wave.

7. The apparatus according to claim 3, wherein an asymptotic solution of a characteristic equation of Lamb wave is used as a phase velocity of the Lamb wave for determining the frequency of the transmitted ultrasonic wave.

8. The apparatus according to claim 4, wherein an asymptotic solution of a characteristic equation of Lamb wave is used as a phase velocity of the Lamb wave for determining the angle of incidence of the transmitted ultrasonic wave.

9. An apparatus for measuring a flow velocity profile of fluid flowing in a tubular member made of material that allows an acoustic wave to propagate therethrough, based on the frequency of ultrasonic wave reflected off reflectors existing in the fluid changing depending on the fluid flow velocity due to Doppler, comprising:
a wedge that externally mounts to the tubular member, the wedge being made of material that allows an acoustic wave to propagate therethrough; and
an ultrasonic wave transducer that emits ultrasonic wave mounted to the wedge at an inclination relative to the direction in which the fluid travels through the tubular member,
wherein the frequency of the transmitted ultrasonic wave is set at a frequency lower than a cutoff frequency of a wave in a first order mode of antisymmetric Lamb wave, the cutoff frequency being determined from a dispersion curve of the Lamb wave.

10. The apparatus according to claim 9, wherein an asymptotic solution of a characteristic equation of Lamb wave is used as a phase velocity of the Lamb wave for determining the frequency of the transmitted ultrasonic wave.

11. A method of measuring a flow velocity profile of fluid traveling in a tubular member made of a material that allows an acoustic wave to propagate therethrough, based on the frequency of ultrasonic wave reflected off reflectors existing in the fluid changing depending on the fluid flow velocity due to Doppler effect, comprising the steps of:
mounting externally on the tubular member, a wedge made of a material that allows an acoustic wave to propagate through;
mounting an ultrasound transducer on the wedge at an inclination relative to the direction in which the fluid travels through the tubular member, the wedge also being made of material that allows an acoustic wave to propagate therethrough;
setting the frequency of the transmitted ultrasonic wave emitted by the ultrasonic wave transducer at a frequency other than the frequency at which an angle of refraction of a wave in each mode of Lamb wave in the tubular member becomes 90° relative to an axis extending perpendicular to the direction in which the fluid travels through the tubular member;
calculating the flow velocity profile based on an ultrasonic wave emitted by the ultrasound transducer at the set frequency and the frequency of the ultrasonic wave reflected off reflectors existing in the fluid and shifted from the emitted set frequency; and
outputting the calculated flow velocity profile,
wherein the frequency at which the wave angle of refraction in each mode of lamb wave in the tubular member becomes 90° relative to the axis extending perpendicular to the direction in which the fluid travels through the tubular member is calculated from an angle of incidence of the ultrasonic wave made incident onto the tubular member from the wedge, a sound velocity in the wedge, sound velocities of a shear wave and a longitudinal wave in the tubular member, and a wall thickness of the tubular member.

12. The method according to claim 11, wherein the frequency of the transmitted ultrasonic wave is set around the central frequency between two frequencies at each of which an angle of refraction of a wave in each of two successive modes of Lamb wave in the tubular member becomes 90° relative to the axis extending perpendicular to the direction in which the fluid travels through the tubular member, each of the two frequencies being calculated from the angle of incidence of the ultrasonic wave made incident onto the tubular member from the wedge, the sound velocity in the wedge, the sound velocities of the shear wave and the longitudinal wave in the tubular member, and the wall thickness of the tubular member.

13. The method according to claim 11, wherein the frequency of the transmitted ultrasonic wave is set lower than the frequency at which an angle of refraction of a wave in a first order mode of antisymmetric Lamb wave in the tubular member becomes 90°, the frequency at which the wave angle of refraction in the first order mode of antisymmetric Lamb wave in the tubular member becomes 90° relative to the axis extending perpendicular to the direction in which the fluid travels through the tubular member being calculated from the angle of incidence of the ultrasonic wave made incident onto the tubular member from the wedge, the sound velocity in the wedge, the sound velocities of the shear wave and the longitudinal wave in the tubular member, and the wall thickness of the tubular member.

14. The method according to claim 11, wherein the ultrasonic wave is made incident from the wedge onto the tubular member at an angle of incidence larger than the angle of incidence at which an angle of refraction of a wave in a first order mode of antisymmetric Lamb wave in the tubular member becomes 90° relative to the axis extending perpendicular to the direction in which the fluid travels through the tubular member.

15. The method according to claim 11, wherein an asymptotic solution of a characteristic equation of Lamb wave is used as a phase velocity of the Lamb wave for determining the frequency of the transmitted ultrasonic wave.

16. The method according to claim 14, wherein an asymptotic solution of a characteristic equation of Lamb wave is used as a phase velocity of the Lamb wave for determining the angle of incidence of the transmitted ultrasonic wave.

17. The method according to claim 11, further including the steps of deriving an actual flow calibration constant for calibrating the flow rate derived from a measured flow velocity profile by calculating the flow rate from the flow velocity profile measured with the ultrasonic wave transducer mounted on a reference tubular member at a reference flow rate and comparing the calculated flow rate to a reference flow rate as measured by a reference flow rate measuring device.

18. The method according to claim 17, wherein the actual flow calibration constant is held as a calibration constant characteristic of each ultrasonic wave transducer.

19. The method according to claim 11, wherein the measured flow velocity profile is corrected on the basis of a result of calculation of an error of measurement due to Lamb wave.

20. A method of measuring a flow velocity profile of fluid traveling in a tubular member made of a material that allows an acoustic wave to propagate therethrough, based on the frequency of ultrasonic wave reflected off reflectors existing in the fluid changing depending on the fluid flow velocity due to Doppler effect, comprising the steps of:
mounting externally on the tubular member, a wedge made of a material that allows an acoustic wave to propagate through;
mounting an ultrasound transducer on the wedge at an inclination relative to the direction in which the fluid travels through the tubular member, the wedge also being made of material that allows an acoustic wave to propagate therethrough;
setting the frequency of the transmitted ultrasonic wave at a frequency lower than a cutoff frequency of a wave in a first order mode of antisymmetric Lamb wave, the cutoff frequency being determined from a dispersion curve of the Lamb wave;
obtaining the flow velocity profile based on an ultrasonic wave emitted by the ultrasound transducer at the set frequency and the frequency of the ultrasonic wave reflected off reflectors existing in the fluid and shifted from the emitted set frequency; and
outputting the flow velocity profile.

21. The method according to claim 20, wherein an asymptotic solution of a characteristic equation of Lamb wave is used as a phase velocity of the Lamb wave for determining the frequency of the transmitted ultrasonic wave.

22. The method according to claim 20, further including the steps of deriving an actual flow calibration constant for calibrating the flow rate derived from a measured flow velocity profile by calculating the flow rate from the flow velocity profile measured with the ultrasonic wave transducer mounted on a reference tubular member at a reference flow rate and comparing the calculated flow rate to a reference flow rate as measured by a reference flow rate measuring device.

23. The method according to claim 22, wherein the actual flow calibration constant is held as a calibration constant characteristic of each ultrasonic wave transducer.

24. The method according to claim 20, wherein the measured flow velocity profile is corrected on the basis of a result of calculation of an error of measurement due to Lamb wave.

25. An apparatus for measuring a flow velocity profile of fluid flowing in a tubular member made of material that allows an acoustic wave to propagate therethrough, based on the frequency of ultrasonic wave reflected off reflectors existing in the fluid changing depending on the fluid flow velocity due to Doppler effect, comprising:
a wedge that externally mounts to the tubular member, the wedge being made of material that allows an acoustic wave to propagate therethrough; and
an ultrasonic wave transducer that emits ultrasonic wave mounted to the wedge at an inclination relative to the direction in which the fluid travels through the tubular member,
wherein the angle of the ultrasonic wave made incident from the wedge onto the pipe is at an angle of incident other than the angle of incidence at which an angle of refraction of a wave in each mode of Lamb wave in the tubular member becomes 90° relative to an axis extending perpendicular to the direction in which the fluid travels through the tubular member, and
wherein the angle of incidence at which the angle of refraction of a wave in each mode of Lamb wave in the tubular member becomes 90° relative to the axis extending perpendicular to the direction in which the fluid travels through the tubular member is calculated from the frequency of the transmitted ultrasonic wave, a sound velocity in the wedge, sound velocities of a shear wave and a longitudinal wave in the tubular member, and a wall thickness of the tubular member.

26. The apparatus according to claim 25, wherein the angle of incidence from the wedge onto the tubular member is larger than the angle of incidence at which the angle of refraction of a wave in a first order mode of antisymmetric Lamb wave in the tubular member becomes 90° relative to the axis extending perpendicular to the direction in which the fluid travels through the tubular member.

* * * * *